Figure 6:
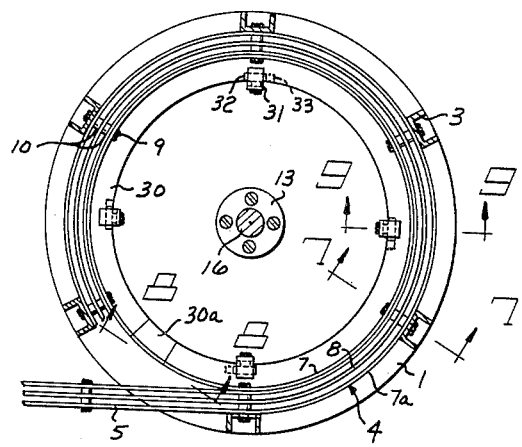

Jan. 1, 1963
J. T. GRAHAM ETAL
3,071,240
HELICAL STORAGE UNITS
Filed Aug. 3, 1960
2 Sheets-Sheet 1
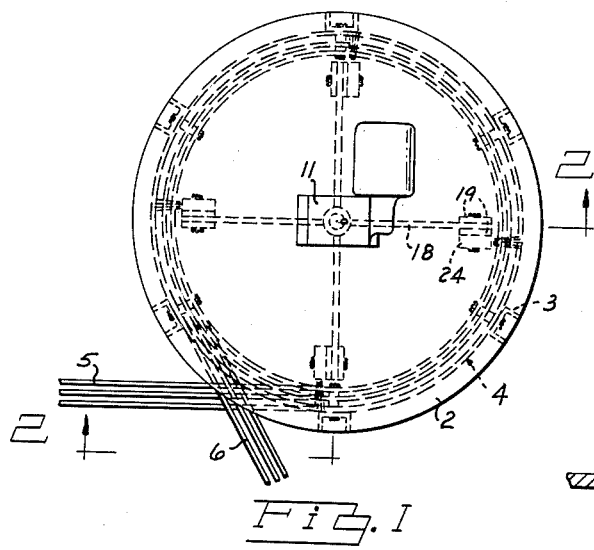
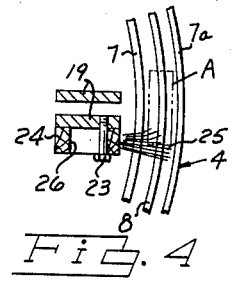
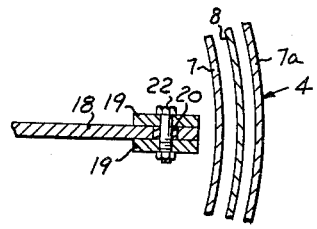
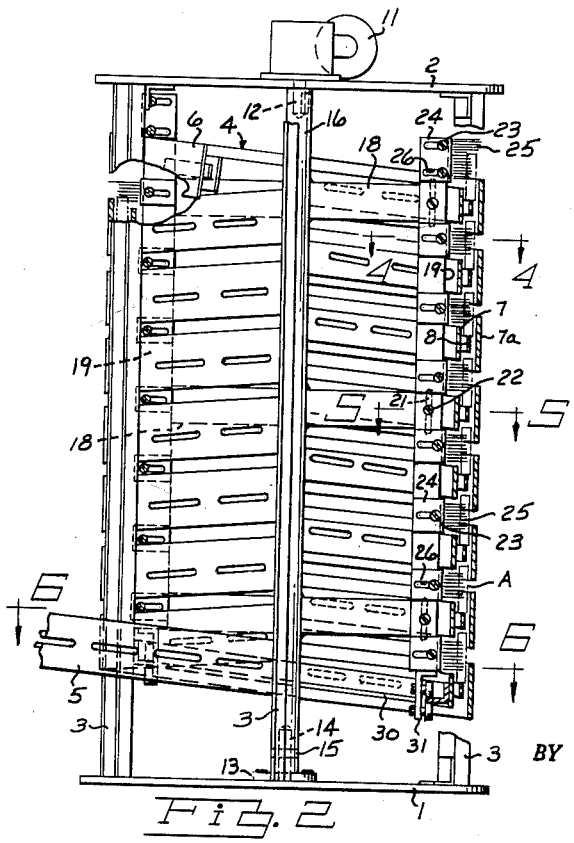
INVENTORS
JAMES T. GRAHAM
JOHN G. KAY
BY
ATTORNEY Jan. 1, 1963   J. T. GRAHAM ETAL   3,071,240
HELICAL STORAGE UNITS Filed Aug. 3, 1960

2 Sheets-Sheet 2

INVENTORS
JAMES T. GRAHAM
JOHN G. KAY

BY Gerald F. Baldwin

ATTORNEY

United States Patent Office 3,071,240
Patented Jan. 1, 1963

3,071,240
HELICAL STORAGE UNITS
James T. Graham, Southfield Township, Oakland County, and John G. Kay, Detroit, Mich., assignors to F. Jos. Lamb Company, Detroit, Mich., a corporation of Michigan
Filed Aug. 3, 1960, Ser. No. 47,314
5 Claims. (Cl. 198—212)

This invention relates to improvements in helical storage units, and refers particularly to such units wherein workpieces may be transported either upwardly or downwardly.

It frequently happens in automated installations that between machines by which consecutive operations are performed not only must a considerable number of partly processed workpieces be stored, but they must also be elevated from the discharge mechanism of one machine to the feed mechanism of the next. Consequently at the present time it is a common practice to utilize both an elevator and a storage unit. Again, in storage units through which workpieces travel downwardly the inclination of the chuting is usually steep enough for them to slide or roll down of their own volition, and sometimes they damage, or are damaged by, other workpieces already at the bottom waiting to be discharged, if the workpieces are largely finished and must be held to close tolerances.

This invention aims, among other things, to provide a helical storage unit including means for moving workpieces either upwardly or downwardly therethrough merely by reversal of the driving means. The inclination of the chuting along which the workpieces travel may be very slight so that the coils of the chuting are very close one beneath the other. Not only does that arrangement reduce to a minimum the amount of power required to move workpieces upward, but it also increases the storage capacity to a maximum for any given height and diameter of unit. Moreover the same means is employed for moving workpieces downwardly, after reversing the direction of the driving means, in cases where the inclination of the chuting is so slight that they will not travel unaided, or in cases where the chuting is relatively steep it limits their speed of travel and eliminates their travelling so fast that they will either damage other workpieces ahead or be damaged by them.

Another object of the invention is to eliminate the use of a separate elevator and to provide a storage unit upwardly through which workpieces may be advanced so that by the time they have reached the discharge end they have attained the necessary height for delivery to the feed mechanism of the next machine.

Another object of the invention is to provide such a storage unit with means for frictionally urging workpieces either up or down an inclined path, and for maintaining them adjacent the discharge end of the unit for delivery as required.

A further object of the invention is to provide such a storage unit including a plurality of brushes by which workpieces are gradually swept along a helical path, and wherein a cam mechanism is employed for gradually increasing or decreasing the elevation of the brushes as they travel around almost 360 degrees and then returns them to their initial positions. Since the inclination of the path along which the workpieces travel is usually slight and the return of the brushes to their initial positions is rapid no appreciable movement of workpieces can occur during that time.

Yet another object of the invention is to provide such a helical storage unit for handling not only circular workpieces but also others having sliding characteristics.

Figure 7:
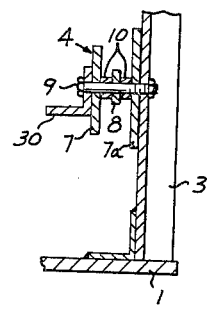
Figure 9:
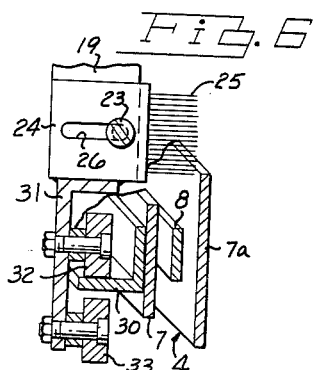
Figure 10:
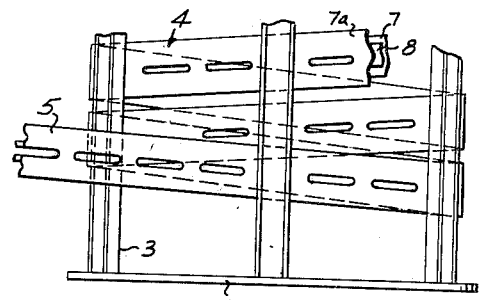
Figure 8:
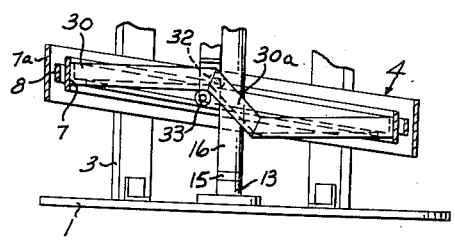

With these and other objects and advantages in view which will become apparent as the specification proceeds, the invention is hereinafter more fully described with the aid of the accompanying drawings, in which:

FIGURE 1 is a plan view of the invention.
FIGURE 2 is a side view thereof partly in section, and taken on the line 2—2 of FIGURE 1.
FIGURE 3 is an enlarged sectional view of the chuting and showing one of the brushes.
FIGURES 4 and 5 are enlarged sections on the lines 4—4 and 5—5, respectively, of FIGURE 2.
FIGURE 6 is a section on the line 6—6 of FIGURE 2.
FIGURE 7 is an enlarged section on the line 7—7 of FIGURE 6.
FIGURE 8 is a view on the line 8—8 of FIGURE 6 showing the cam track on the inner face of the inner guide rail.
FIGURE 9 is an enlarged section on the line 9—9 of FIGURE 6 showing the cam track, and
FIGURE 10 is a partial view showing the lower extremity of the chuting and the vertical supports.

We will first describe the invention feeding workpieces upwardly therethrough in which case it also functions as an elevator.

Referring to the drawings, 1 and 2 designate a base plate and a cap, respectively, held in spaced relation by substantially circularly arranged supports 3 to constitute a frame. 4 denotes helical chuting upwardly along which workpieces A are adapted to travel from a suitable feed conveyor 5 at the bottom to a discharge conveyor 6 connected to its upper extremity. The chuting 4 consists of an inner and an outer helically wound rail 7 and 7a respectively, spaced between which is a helically wound carrier rail 8. The inclination, or pitch, of all three rails is the same, however the outer rail 7a is taller than the inner rail, and each of its coils projects both above and beneath the latter. The carrier rail 8 is of lesser height than the inner rail 7 and so positioned relative thereto that the rail 7 projects upwardly beyond the top of rail 8 and downwardly below the bottom of rail 8, as shown most clearly in FIG. 3. Each turn of the helical rails is secured to each of the supports 3 as by bolts 9 having spacers 10 thereon to retain the three rails uniformly spaced from one another.

Mounted on the cap 2 is a motor driven speed reducer unit 11 the drive shaft 12 of which extends downwardly through the said cap and is coaxial with the helical chuting 4. Mounted upon the base plate 1 coaxial with the drive shaft 12 is a bearing 13 having an upwardly projecting pin 14 mounted therein around which a thrust ring 15 is arranged on the top of the bearing. Fixedly secured to the drive shaft 12 for rotation therewith is a spindle 16 the lower extremity of which rests upon the thrust ring 15, and is axially bored to receive the upper extremity of the pin 14.

Secured as by welding to the spindle 16 for rotation therewith are vertically spaced sets of radial arms 18 with each arm of one set in vertical alignment with one arm of each of the other sets. Supported for limited vertical movement by and extending across opposite sides of each vertically aligned row of arms 18 are opposed slides 19 which are substantially the same length as the height of the chuting. The arms have bushings 20 extending horizontally therethrough which are very slightly longer than the width of the arms. Formed through each pair of slides 19 are vertically spaced slots 21 (FIGURE 2) for the passage of bolts 22 each of which also extends through one of the bushings 20. Thus the slides are readily vertically movable relative to the arms. Secured on the outer face of one of each pair of slides 19 as by bolts 23, and spaced vertically from one another a distance equal to that of the pitch of the helical chuting, are brushes 24 the bristles 25 of which project into the chuting between adjacent turns of the inner guide rail 7 to sweep workpieces along the chuting in an upward direction. The bolts 23 pass through horizontal slots 26 in the brushes so that the radial distance they project from the spindle 16 may be adjusted to increase or decrease the brushing action of the bristles on the workpieces.

30 denotes a circular cam track (FIGURES 8 and 9) which is secured to the inner face of the lower extremity of the inner guide rail 7 and extends helically for almost one complete turn in horizontal alignment with the guide rail. Thus the pitch of the cam track is equal to the pitch of the helical chuting throughout almost all its circumference. The opposite extremities of the helical portion of the cam track are connected by a short track portion 30a which is vertically inclined in the opposite direction to complete a circular path. Secured to the underside of each pair of slides 19 is a depending cam arm 31 having vertically spaced rollers 32 and 33 mounted thereon. The upper roller 32 on each arm rides upon the upper surface of the cam track and the lower roller 33 rides beneath and is slightly spaced beneath the underside thereof to insure proper movement of the cam arms as they travel around the track. Thus as the spindle 16 and the arms 18 rotate the slides 19 are gradually raised during their travel around almost 360 degrees, and the brushes 24 during that time project between adjacent turns of the helically wound inner guide rail 7 and sweep the workpieces on the chuting upwardly; and when the cam arms pass over the cam track portion 30a the rollers 32 follow the portion 30a, carrying their respective slides 19 and the brushes 24 mounted thereon downwardly to their original position to recommence their upward travel around the said helical path. It will be noted that each brush on each pair of slides travels around one almost complete turn in its helical path and then drops back to its initial position, yieldingly passing over a respective inner guide 7 as it drops down. The bristles 25 are resilient and are preferably made of nylon so that their downward movement past one turn of the inner guide rail 7 does not impair their efficiency.

The inclination or pitch of the helix is relatively slight so that no great amount of force is required to sweep the workpieces along their upward path; and again the angular distance which the brushes travel during their downward movement is quite short, and even during portions of that time some of the bristles are positioned to contact some of the workpieces. In actual practice it is found that in many cases the bristles contact workpieces more or less intermittently and cause them to travel a little in advance of the brushes even if one or two workpieces are being swept along together. Again, when workpieces collect at the upper extremity of the unit due to the closing of a gate or stop (not shown) on or adjacent the discharge conveyor 6, they are retained in position to enter the latter and are not split from the chuting or otherwise disturbed by passing brushes though the latter prevent them from rolling back downwardly.

From the foregoing it will be readily seen that even workpiece portions of which have already been finished to close tolerances may be safely handled by this unit since they are merely swept along the chuting by the brushes, and the strength and resilience of the bristles are such as to impart easy movement to them, and yet strong enough both to prevent workpieces overtaking brushes immediately ahead and to retain them adjacent the discharge end for delivery to the conveyor 6.

Again for handling delicate workpieces which might be damaged if they were travelling fast when they contacted other workpieces ahead, this arrangement may also be employed if the workpieces are to move downwardly instead of upwardly by merely reversing the direction of rotation of the drive unit 11 and the spindle 16, and using the top conveyor 6 as the feed conveyor and the bottom one 5 as the discharge conveyor. In this case unless the bottom conveyor is power driven it must of course be downwardly and outwardly inclined.

It will also be noted that throughout the height of the storage unit a plurality of brushes are spaced to engage workpieces on each coil of the chuting, and should the pitch be relatively steep, the brushes in front prevent workpieces overtaking and passing them. On the other hand the arrangement has the advantage that the pitch of the chuting may be made quite slight, because if it were not sufficient for workpieces to travel downwardly unaided the brushes insure their passage throughout the length of the chuting. Obviously the less the pitch of the chuting the greater the amount of storage space provided in a unit of a given height and diameter.

While in the foregoing the preferred embodiment of the invention has been described and shown, it is understood that alterations and modifications may be made thereto, provided the said alterations and modifications fall within the scope of the appended claims.

What we claim is:

1. A storage unit comprising a frame, helical chuting mounted thereon, a spindle mounted for rotation on the frame coaxial with the chuting, vertically aligned arms carried by and projecting laterally from the spindle, a plurality of outwardly projecting brushes, slides mounted for vertical movement on the aligned arms supporting the brushes, a helical cam track mounted on the frame, and means on each slide for coaction with the cam track, said cam track being parallel with the chuting around almost the entire circumference of the track and terminating in an abruptly inclined portion inclined in the opposite direction to complete its circumference, whereby each brush is adapted to travel around almost one complete turn of the chuting in contact with workpieces thereon to brush them therealong and then return to its initial position to re-commence its travel around the same helical path.

2. A helical storage unit comprising a frame, helical chuting secured to said frame, a spindle mounted on the frame for rotation coaxial with said chuting, arms projecting radially from said spindle and secured thereto, slides carried by said arms for vertical movement relative thereto, brushes mounted on the slides projecting laterally therefrom into interfering relation with articles disposed within said chuting, and cam means on the slides and the frame for moving the brushes in a path parallel to the path of said chuting for substantially the entire circumference of the chuting during rotation of the spindle.

3. The combination in claim 2, wherein the cam means includes a cam track mounted on the frame and extending in parallel relation to the chuting throughout substantially one complete turn of the same, said track having a terminal portion inclined opposite to the inclination of said chuting, and rollers mounted on the slides and adapted to engage said cam track whereby the brushes are moved in a path corresponding to the path defined by said cam track.

4. A helical storage unit comprising a frame, helical chuting secured to the frame, a spindle mounted on the frame for rotation coaxial with the chuting, arms mounted on the frame and projecting radially therefrom, members carried by said arms and extending vertically adjacent said chuting substantially the entire height thereof and spaced inwardly from said chuting, said members being vertically shiftable relative to said arms, a series of brushes mounted on each member with each brush projecting between adjacent turns of the chuting to urge workpieces therealong, a cam track secured to the chuting and inclined in a path corresponding to the path of said chuting throughout substantially the entire length of the track and terminating in an oppositely inclined portion, rollers mounted on said members to engage and ride upon said cam track as the spindle rotates whereby the brushes carried by the members contact workpieces disposed upon the chuting to urge said workpieces therealong.

5. A helical storage unit comprising a frame, helical chuting secured to the frame, a spindle mounted on the frame for rotation coaxial with said chuting, arms projecting radially from the spindle, members mounted on said arms extending vertically substantially the entire height of said chuting and spaced inwardly from the chuting, said members being vertically shiftable relative to said arms, frictional engaging means projecting laterally from the members and carried thereby to project between each successive turn of said chuting to urge workpieces therealong, a cam track mounted on said chuting, rollers mounted upon said members and engaging said cam track to roll therealong, with the cam track describing a path parallel to the path of said chuting throughout substantially the entire length of said track whereby said frictional means is moved by the rotation of the spindle in a path corresponding to the helical path of the chuting.

References Cited in the file of this patent

UNITED STATES PATENTS

| | | |
|---|---|---|
| 599,904 | Kempshall | Mar. 1, 1898 |
| 1,521,290 | Hauge | Dec. 30, 1924 |
| 2,628,708 | Wahl et al. | Feb. 17, 1953 |
| 2,790,537 | Howe et al. | Apr. 30, 1957 |
| 2,861,677 | Van Marle | Nov. 25, 1958 |